United States Patent [19]

Alcott

[11] 4,158,797

[45] Jun. 19, 1979

[54] POWER HOIST

[75] Inventor: David K. Alcott, Rehoboth, Mass.

[73] Assignee: Haulamatic Corporation, East Providence, R.I.

[21] Appl. No.: 770,986

[22] Filed: Feb. 22, 1977

[51] Int. Cl.² .......................... H02P 3/10; H02P 3/14
[52] U.S. Cl. ...................................... 318/371; 192/2; 254/186 HC
[58] Field of Search ............... 318/371, 372, 362, 159; 254/189; 192/2, 41 S

[56] References Cited

U.S. PATENT DOCUMENTS

| | | | |
|---|---|---|---|
| 2,549,870 | 4/1951 | Wallace | 192/2 |
| 2,902,635 | 9/1959 | Kuka | 318/371 |
| 3,708,046 | 1/1973 | Brown | 318/372 |
| 3,773,294 | 11/1973 | Alcott | 192/41 S |

Primary Examiner—David Smith, Jr.
Attorney, Agent, or Firm—Salter & Michaelson

[57] ABSTRACT

A power hoist is disclosed wherein a single operating lever is moved between haul, hold and lock positions. A load may be suspended when the hoist is in hold position by means of braking action which is primarily provided by closing a shunting switch across the leads of a DC motor whereby the motor functions as a brake, which holding action, when necessary, is supplemented by a positive mechanical locking device engageable with the gear train. The combination of electrical shunt holding means with mechanical locking means, both operated by the same lever member enables convenient and improved hoist action in which the load may be securely held in a suspended position without any creepage taking place, and without danger of damage to the mechanical locking system.

3 Claims, 7 Drawing Figures

POWER HOIST

BACKGROUND OF THE INVENTION

Hoists, operable between several positions such as haul or wind, hold or brake, and lock, and which operate from a single lever, are known in the art as shown, for example, by U.S. Pat. No. 3,773,294 issued Nov. 30, 1973. It is also known to utilize a shunting circuit across the armature of a motor associated with a hoist so as to provide, in effect, a dynamic brake to the gear drive system connected thereto, when the hoist is in a hold or lock position. Such shunting devices undesirably do, however, permit, especially when overloaded, some creep to occur within the gear drive train and accordingly permit some load movement. It would thus be desirable to provide a supplemental braking system to prevent such creep.

The present invention accomplishes these aims by the combination of a system utilizing dynamic hold braking by means of a shunted motor, and a subsequent locking of the gear train by an additional mechanical locking system in combination with the shunt control; both systems controllable sequentially by the same lever mechanism. This novel combination allows loads being hauled or hoisted to be temporarily maintained in a hold or dynamic brake position by the shunting system, and thereafter positively locked in hold position by a mechanical interlock with the gear train. As the bulk of the braking is designed to be accomplished by the motor shunt, the mechanical lock need only provide an incremental force, and thus need not be extremely rugged and hence costly construction.

The present invention thus effectively includes a hoist having a gear drive system in which an operating lever is selectively movable between a hold position in which the DC motor thereof is de-energized and in which a shunting switch is closed across the leads of the motor to form a dynamic braking action to the associated gear system, and a lock position in which the motor remains in the above disclosed shunted mode but wherein an added mechanical lock is engaged with the gear train, and a wind or haul position in which the motor is energized and both the shunt braking and locking systems are automatically disengaged.

Accordingly, the primary object of the present invention is to provide a power hoist which permits single lever operation between a hold position in which dynamic braking of the motor is accomplished by use of a shunt circuit, and a lock position wherein additional mechanical locking means is interengaged with the gear train thereof.

A further object of the present invention is the provision of a power hoist including the combination of dynamic braking by means of a shunt circuit across the motor and an additive mechanical gear train locking system wherein convenient and uncomplicated actuation of the mechanical system is provided through a novel bracket assembly.

Other objects, features, and advantages of the invention will become apparent when the description thereof proceeds when considered in connection to accompanying illustrative drawings.

DESCRIPTION OF THE DRAWINGS

In the drawings which illustrate the best mode presently contemplated for carrying out the present invention.

DESCRIPTION OF THE INVENTION

Figure 1:
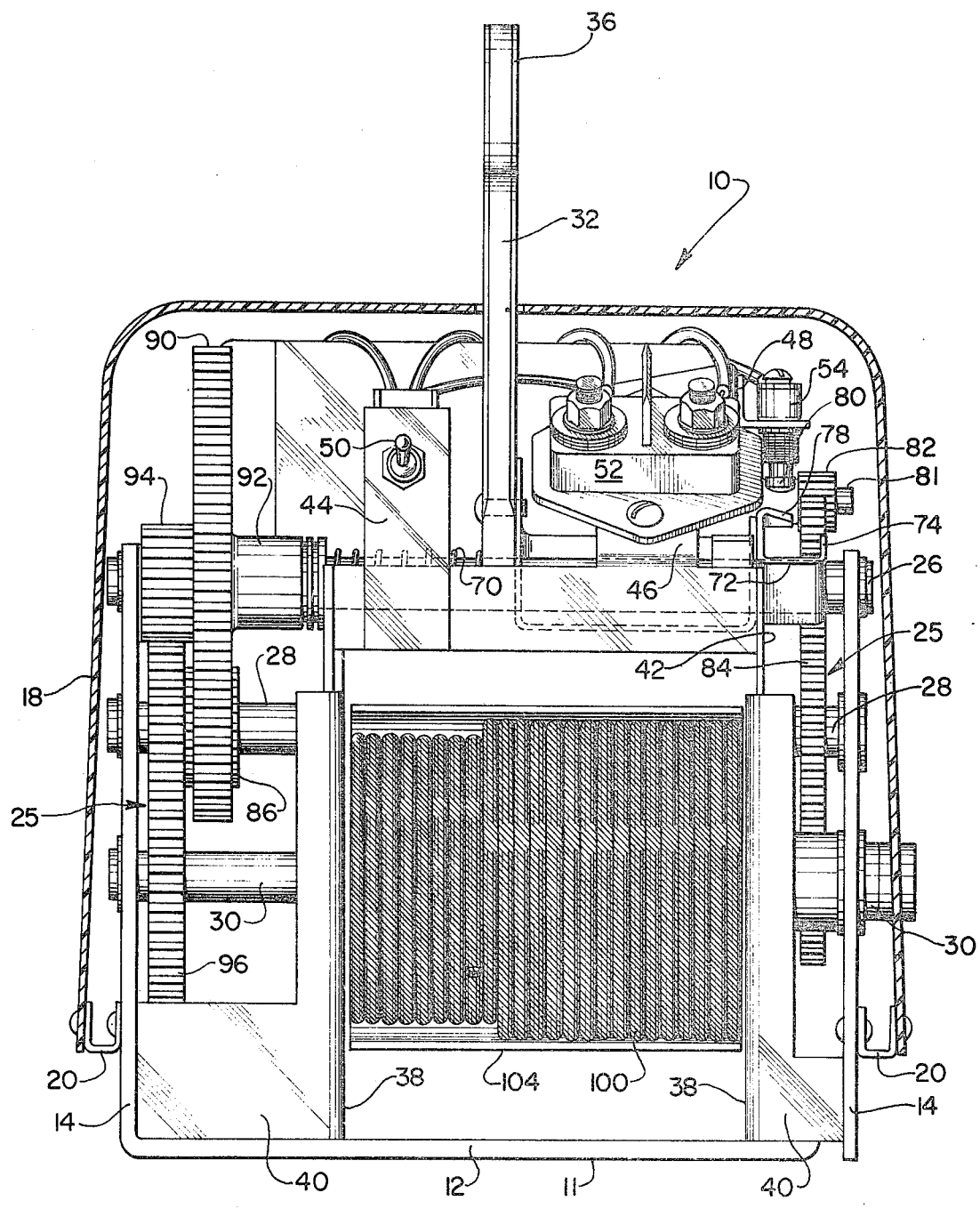
FIG. 1 is a front elevational view of a power hoist constructed in accordance with the invention, the front portion of the outer casing having been removed for purposes of clarity.
Figure 2:
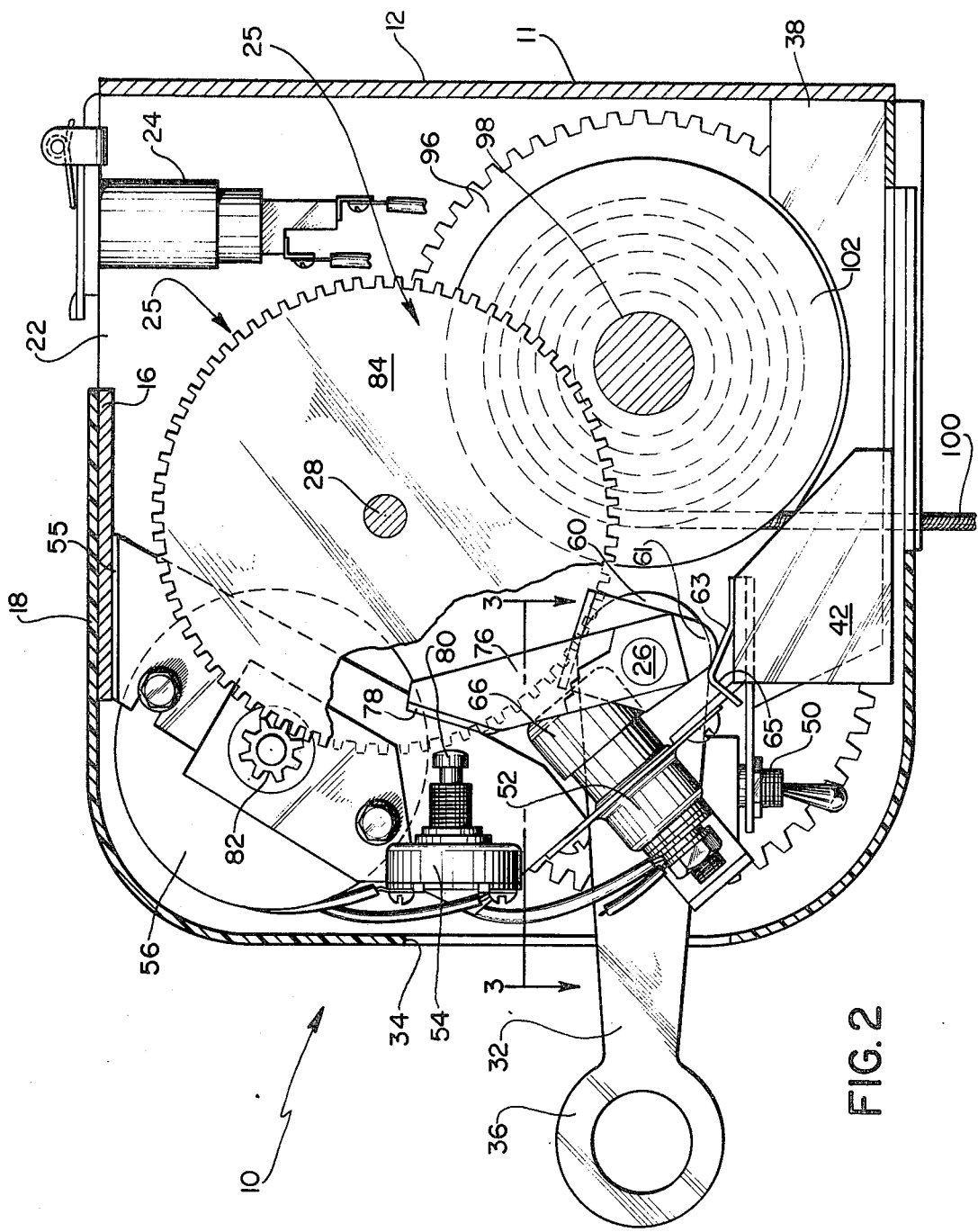
FIG. 2 is a side elevational view thereof with the side wall removed for purposes of illustration.

Turning now to the drawings and particularly FIGS. 1 and 2 thereof, the power hoist of the present invention is shown generally at 10 and includes a support 11 having a bottom wall 12, spaced side walls 14 and a rear wall 16, although in use the hoist 10 will frequently be positioned on its side, as shown in FIG. 2. A casing 18 serves to enclose the hoist 10 and its support 11 and is adapted to be removably secured to the U-shaped channel members 20 extending longitudinally along the outer surface of the opposed spaced side walls 14 adjacent the bottom ends thereof. In this manner, the channel members 20 serve to space the casing 18 from the various projecting shaft members, as illustrated most clearly in FIG. 1. The lower portion of rear wall 16, as well as the rear portion of casing 18, is provided with an opening 22 to provide access for electrical connector means 24 and as an aid in general interior access to the gear train 25 of the power hoist 10 itself.

The hoist 10 is preferably mounted as shown in FIG. 2 from a vertical supporting structure (not shown) by means of bolts in cooperating key hole shaped openings through the lower wall 12, which in normal use as a hoist would be vertically disposed. The relatively open front end of the hoist, as can be seen best from FIG. 2, would then be downwardly disposed.

Several shafts extend between and are supported at the ends thereof in aligned openings provided in the spaced side walls 14. A control shaft 26 is fixedly or non-rotatably mounted between the side walls 14 as is a rotatable transmission or drive shaft 28 and a rotatable cable drum shaft 30. Both the rotatable shafts, that is the drive shaft 28 and cable drum shaft 30, are mounted in suitable bearings carried by the side walls 14.

Rotatably mounted on control shaft 26 is an operating lever 32 which lever extends outwardly through a slot 34 provided in the top wall of casing 18 and terminates in a circular eye portion 36 which permits remote control operation of the lever 32 by means of a cable (not shown) attached thereto. The extent of the slot 34 is such to permit sufficient pivotal movement of the lever 32 about the shaft 26 to assume the various operating positions of the lever, as will hereinafter be more fully explained.

The front face of the power hoist 10 is framed by a pair of upstanding side bracket members 38 having curved base portions 40. A connecting bracket portion 42 of a generally U-shaped configuration serves to connect side brackets 38. The connecting bracket 42 is in turn provided with an upwardly extending portion 44 and an upwardly and rearwardly extending portion 46 to which L-shaped side bracket 48 is attached, which brackets and portions thereof respectively form mounting means for a reversing switch 50, a motor activation switch 52 and a shunt switch 54. Bracket portions 44, 46 and 48 may be integrally formed as extensions of the bracket 42 or separately connected thereto in any suitably known manner. Furthermore, a portion of the extension 46 is connected to the rear wall 16 as at 55 (FIG. 2) by conventional means and in part forms a cradle for the mounting of a DC motor 56. The motor 56 in turn is wired into the circuit illustrated by the wiring diagram of FIG. 7 of the drawings.

Figure 7:
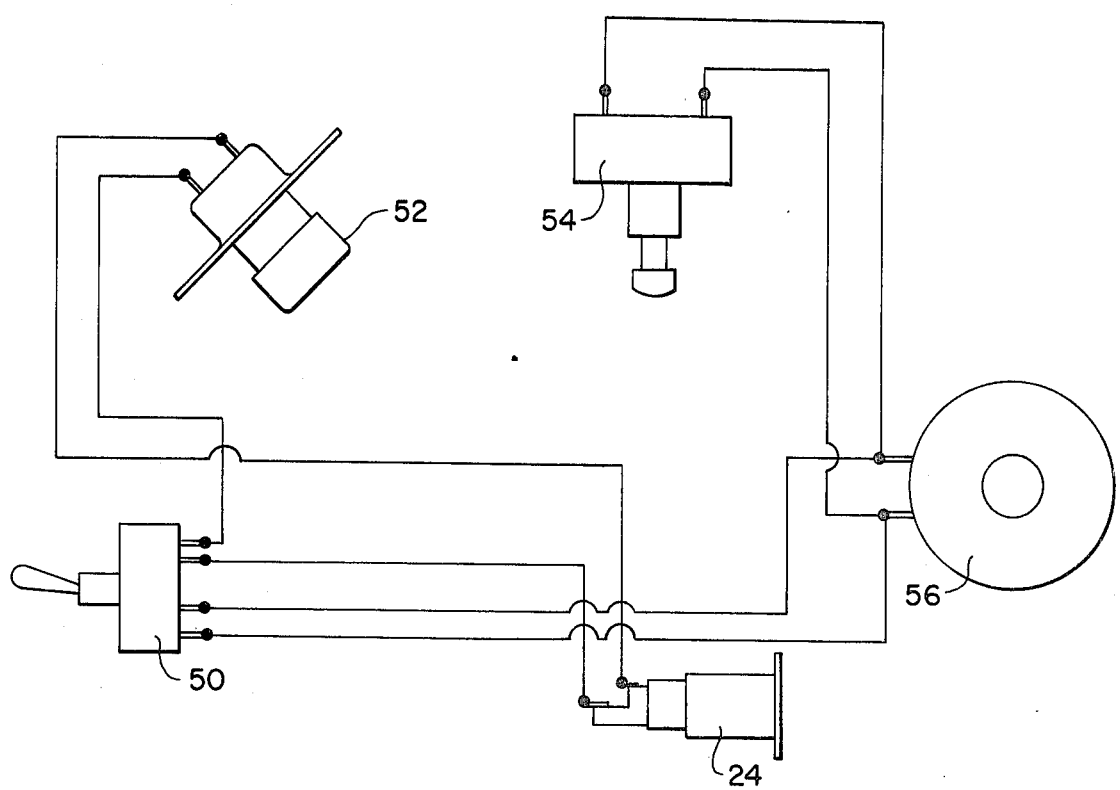
FIG. 7 is a schematic electrical diagram of the hoist circuit.

As will be apparent from examination of FIG. 7, the shunt switch 54 is connected across the leads of the motor 56 in such a way that when the shunt switch 54 is operational, that is, when closed across the leads of the DC motor, the motor, which will at that time be de-energized, will function as a brake against movement of the drive train associated therewith. As long as the shunting switch 54 is closed, and the motor de-energized, a dynamic braking action is imparted to the hoist. Also since the shunt in effect brakes the motor armature against any movement caused by a load suspended by the hoist, the load must act in a reverse direction through the gear train and the inherent mechanical disadvantage provided thereby, thus a relatively small motor can serve to brake a relatively large load.

The motor switch 52 is actuated prior to actuation of the shunt switch 54 whereby with the former "on" and the latter "off", the motor will be energized for normal operation. This action takes place in the haul position wherein the gear train serves to rotate drum shaft 30 so as to take up or let out the cable wound therearound, and to which the load is secured as by a hook or other known connection or holding means. The switch 50 is of a reversing toggle type and is provided to change the direction of the DC motor and thus the rotation of drum shaft 30, without interfering with the function of the other switches, so that the controls imparted by the selective positioning of the lever 32, as will hereinafter be explained, are available regardless of whether the power hoist is being utilized to lift or lower a load.

Figure 3:
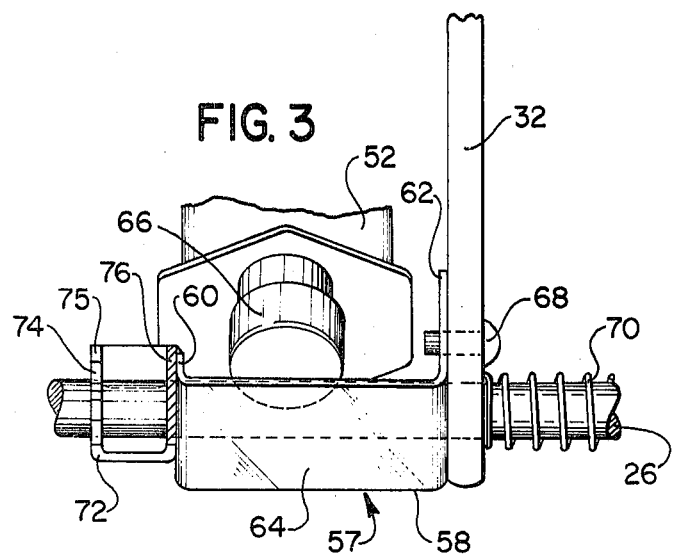
FIG. 3 is a partial sectional view on an enlarged scale taken along the line 3—3 of FIG. 2 and shows in particular, the manner in which the bracket assembly engages the motor activating switch.

Switch engaging means including a bracket assembly 57 (FIG. 3) for activating and deactivating the power switch 52 and the shunt switch 54 is pivotally mounted on the control shaft 26 and secured to the operating lever 32 for movement therewith. Such switch actuator means comprises a power switch actuator member 58 of generally U-shaped configuration having side walls 60 and 62 interconnected by a connecting wall 64 which, as is best shown by referring to FIG. 3 of the drawing, is adapted to contact and depress an actuator button 66 of motor switch 52. Actuator member 58 is secured to lever 32 by means of a pin 68 passing through aligned openings in both the lever 32 and the side arm 62 of the actuator 58. Spring 70 is loosely mounted around shaft 26 and extends between lever 32 and hub 92, and is biased against lever 32 so as to resiliently urge said lever and the attached bracket assembly 57 as far to the right (when viewing FIG. 1) as these parts can go, thereby insuring that the bracket assembly is properly aligned on shaft 26 with the various switches to be engaged.

Figure 5:
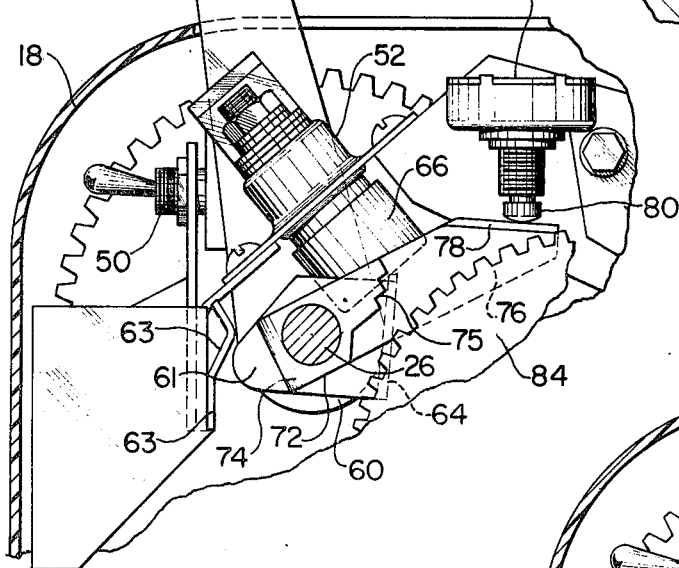
FIG. 5 is also a partial side view thereof and similar to FIG. 4 but showing the lever in its forward or haul position.

A second actuator bracket or member 72 is connected to switch actuation means 57. Such bracket 72 is pivotally mounted on control shaft 26, as by connection to side wall 60 by welding or the like, so that both brackets 58 and 72 move as a unit. The actuator member 72 includes a rearwardly extending arm or detent 74 having an edge provided with a plurality of teeth 75 for interengagement for locking purposes with a toothed gear 84 of the gear train, as will be hereinafter evident, and a rearwardly extending shunt switch actuator arm 76 having a lateral flange 78 adapted to contact the actuator button 80 of the shunt switch 54. Thus, with particular reference to FIG. 5 of the drawings, when the lever 32 is moved to its most forward or haul position, the switch actuation means 57 including member 58 and member 72, by reason of their connection to each other and to lever 32, pivotally rotate about the shaft 26 in a counterclockwise direction so that the connecting arm 64 of member 58, which is normally spaced from the actuating button 66 of the motor switch 52, is engaged therewith so as to depress the button 66 and thus activate the switch 52. At the same time, the simultaneous rotary movement of the actuator arm 76 causes its offset platform or flange portion 78 to contact the button 80 of the shunt switch 54 in order to interrupt or open the normally closed and energized shunt circuit. The relationship of these parts is such that switch 52 is engaged and energized immediately after actuation of switch 54, i.e., the motor 56 is energized just after shunt switch 54 opens, this being important to insure that the motor will never be running against the braking action of the shunt circuit.

Figure 4:
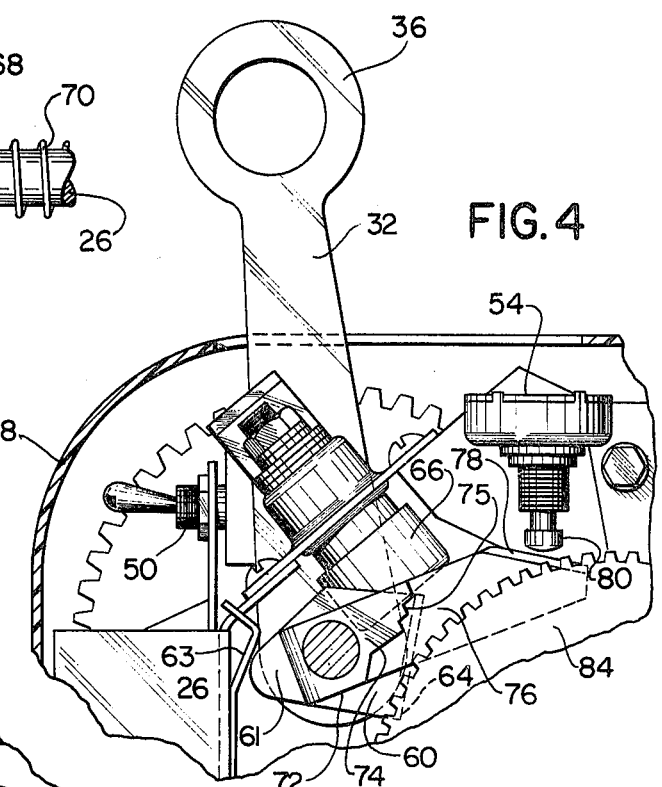
FIG. 4 is a partial side view depicting the lever in the intermediate shunt braking or hold position thereof.

When the lever is moved to the hold or shunt brake position depicted in FIG. 4 of the drawings, the shunt switch 54 is again activated by the release of button 80, just after the motor 56 is de-energized by reason of the release of button 66 as the connector arm 64 of the activator member 58 moves out of the contacting relation therewith. In the lever position thus described and depicted in FIG. 4 of the drawings, the shunt switch 54 results in a dynamic braking of the load being hauled by reason of the shunting of the motor leads across the DC motor 56.

Figure 6:
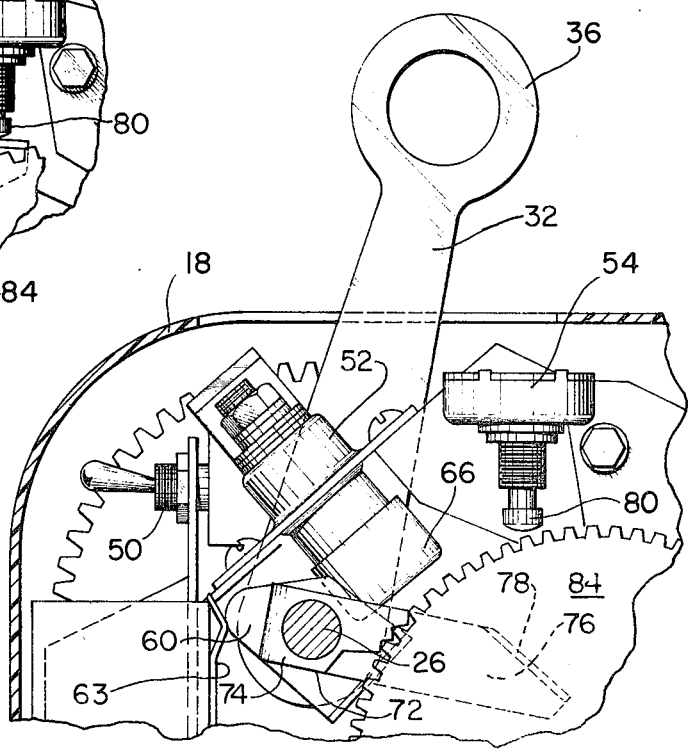
FIG. 6 is a further partial side view thereof similar to FIGS. 4 and 5 but showing the lever in its rear or positive locking position.

When the lever 32 is moved to its most rearward or lock position depicted in FIG. 6 of the drawings, toothed face 75 of the locking arm or detent 74 interengages with a selected gear 84 of the gear train 25, thus providing an added mechanical lock over and above the motor braking feature above described. This incremental mechanical locking by engagement of lock 74 into the gear train 25 is particularly desirable inasmuch as it has been found that with excessive loads, and with only the shunt brake in operation, the gear train 25 will tend to play out very slowly, i.e., creep. In such cases the locking action provided by the engagement of the lock 74 with the gear train need provide holding or locking resistance against a relatively slight force, since the bulk of the holding or braking force is accomplished by the shunting system. Thus the lock 74, upon engagement with gear train, causes no damage to either the gear train or to the lock itself since the gear train is moving very slowly, if at all, when the lock engages. This incremental mechanical locking feature is particularly useful when loads being moved by the power hoist 10 are required to be placed in an exact position, as in connection with the placement of other devices to be assembled therewith. Furthermore the one lever operation which enables quick and easy transition between haul, shunt brake and positive lock positions is particularly useful in enabling such positioning to be carried out with ease and facility.

The reversing switch 50 enables load hauling to be accomplished in either direction, that is, either moving a load upwardly or moving a load downwardly, while also maintaining all the functions of the operating lever 32 in either direction. Also, the forward end 61 of the side wall 60 of actuator member 58 projects past the lock detent portion 74 of the bracket member 72 and is positioned for contact with a leaf spring 63 affixed at one end to the rear face of connector bracket 42 and terminating in a rearwardly extending L-shaped portion 65 at the other end. Such contact is in the brake and lock positions shown in FIGS. 4 and 6 respectively. In the brake position such contact is light. However, when the rearward lever movement causes the bracket arm or side wall 60 to rotate upwardly it moves against the rearwardly extending L-shaped portion to force the spring 63 forwardly so as to override the elbow portion thereof to a position above such elbow, as shown in the lock position of FIG. 6. In such position the spring 63 exerts a rearward force to the entire bracket assembly 57 and thus to the lock detent 74, and accordingly serves to resiliently maintain the mechanical lock in engagement with gear 84, while at the same time acting as a detent to releasably hold the lever 32 in its lock position.

The drive train of the power hoist includes a drive shaft 81 of the motor 56 to which a spur gear 82 is secured, said gear 82 adapted to mesh with gear 84 fixedly mounted on the transmission shaft 28. As best shown by FIG. 1 of the drawings, the teeth of the gear 84 are interengaged by the teeth 75 of the lock detent 74 in the lock position and in this manner serves to form the positive mechanical locking feature of the present invention. In operation, and with the parts in the haul position of FIG. 5, the rotation of the motor drive shaft 81 in turn moves gears 82 and 84. Gear 84 by reason of its fixed connection to drive or transmission shaft 28 causes such to rotate. Drive shaft 28 is in turn provided at the other end thereof with a spur gear 86 adapted to mesh with a larger gear 90 mounted on a hub 92 adapted to rotate about the control shaft 26. Positioned adjacent to the gear 90 is an additional gear 94 which rotates as a unit with gear 90 and drivingly engages the gear 96 in turn connected to the cable drum shaft 30 to cause the rotation thereof in either direction, as controlled by the rotation of the motor 56 in either direction, as selected by the double pole toggle switch 50.

Furthermore, drum shaft 30 is provided with a cable drum 98 around which a coil of cable 100 is wound; one end of the cable being attached to the drum as is known in the art. The cable drum 98 is provided with spaced side walls 102 of rather heavy construction to contain the winding pattern of the cable 100 and an open ended spring member 104 is adapted to apply a circumferential confining action to the cable coil 100, as is known in the art, in order to promote more uniform winding and unwinding of the cable. Any suitable power source, such as a car battery, may be utilized for supplying electrical energy to the motor 56, such connection being made through the connector 24 at the rear of the power hoist.

While there is shown and described herein certain specific structure embodying the invention, it will be manifest to those skilled in the art that various modifications of the parts may be made without departing from the spirit and scope of the underlying inventive concept and that the same is not limited to the particular forms herein shown and described except insofar as indicated by the scope of the appended claims.

What is claimed is:

1. A power hoist comprising a motor, a rotatable cable shaft, a gear drive operably interconnecting said motor with said shaft, an operating lever movable between haul, brake and lock positions of said shaft, a shunt switch connected across said motor and operable in both said brake and lock positions of said shaft to shunt brake said motor, locking means for interengaging said gear drive, and separate second switch means for energizing said motor, said lever including means operable in said haul position to activate said second switch while deactivating both said shunt switch and said locking means, said lever means further operable in said brake position to de-activate both said second switch and said locking means while activating said shunt switch, said lever means still further operable in said lock position to de-activate said second switch while activating both said shunt switch and said locking means, said lever mounted on a fixed control shaft for relative partial rotation thereon, a bracket connected to said lever and also mounted on said control shaft for relative rotation therewith in conjunction with said lever, said bracket having first and second outwardly extending switch engaging portions, said first portion contacting said second switch to actuate same to energize said motor and said portion contacting said shunt switch to actuate same to de-energize said shunt brake when said lever is positioned in haul position, said first portion making contact with said second switch just after said second portion contacts said shunt switch when said lever moves from brake to haul position whereby when said lever moves back from haul to brake position, said shunt switch is energized just after said motor is de-energized.

2. The power hoist of claim 1, said bracket having a third separate outwardly extending locking portion for toothed interengagement with a portion of said gear drive when said lever is in said locked position.

3. A power hoist operable in separate haul, hold and lock modes comprising a motor, a rotatable cable shaft, a drive system operably interconnecting said motor with said shaft and means for selectively activating said operational modes, brake means comprising a shunt switch connected across said motor and operational in both said hold and lock modes to brake movement of a load held by said hoist, and positive locking means mechanically engageable with said drive system in said lock mode to prevent any creep of said drive system in said hold position, said positive locking means being operable only after said shunt switch has been energized, said drive system comprising a gear train including a plurality of toothed mesh gears, said locking means comprising a detent having a portion thereof engageable with one of said gears in said lock mode, said mode selection means including a lever mounted on a fixed control shaft for relative partial rotation thereon, a bracket connected to said lever and also mounted on said control shaft for relative rotation in conjunction with said lever, said bracket having a shunt switch engaging portion operable to de-energize said shunt brake solely in said haul mode, said detent connected to said bracket and rotatable therewith to engage said gear when said lever is in the lock position.

* * * * *